Feb. 24, 1942.   A. J. CAWLEY   2,274,039
TELEVISION
Filed March 3, 1936
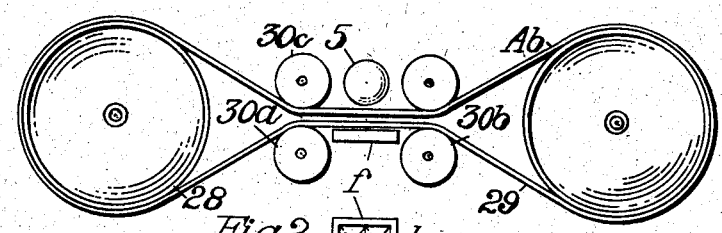
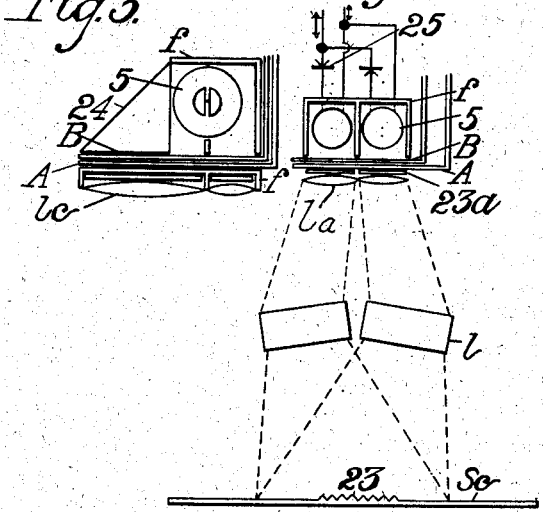
INVENTOR.
Aloysius J. Cawley Patented Feb. 24, 1942

2,274,039

UNITED STATES PATENT OFFICE 2,274,039

TELEVISION

Aloysius J. Cawley, Pittston, Pa.

Application March 3, 1936, Serial No. 66,913

6 Claims. (Cl. 178—7.1)

The invention relates to improved methods of transmitting visual images of objects or pictures from one point to another point by means of wire or wireless. Some of the objects of the invention are as follows:

The provision of a plurality of concentric cylinders in contradistinction to disks for producing the image. One of the cylinders may be a mask to obscure the undesirable intersecting points of the light permeable areas carried on the other two cylinders. Or the third cylinder may carry means for concentrating the light along the path of the intersections produced by the light permeable areas of the other two cylinders.

Improved means is provided for rotating two or more cylinders in opposite directions.

Improved means for framing the picture are disclosed, particularly with the object in view of taking advantage of superposed projection of images. Also, a method of framing is provided wherein two intersecting points producing the scanning traverse or scan the image field alternately. Also, a method of scanning wherein stereoscopic pictures are produced which may also be colored, one modification using two wave sources, another using one wave train with a plurality of circuits containing the photoelectric elements, and another modification utilizing a single wave train and a single lamp which possesses unilateral conducting properties in such manner that one component of the alternating current produces one picture series and the other component produces an entirely distinct series of pictures. A method of framing is also disclosed which obscures the superfluous light dots and eliminates the rotating mask.

A projection process is disclosed which employs two or more projecting means placed at different angles to the screen, while the screen is provided with a series of ridges whereby the light from each projector is projected upon a certain series of surfaces of the ridges. That is, the right hand projecting means projects the pictures on the right hand surfaces, while the left hand projector projects the light on the left hand surfaces. This gives three dimensional effects to the screen.

A method of scanning which employs a single endless band carrying light permeable areas, this band travelling over two drums is also disclosed.

Referring to the accompanying drawing forming part of this specification, in which like reference characters have similar meanings in all of the views and in which, Figure 1 illustrates a very simple scanning medium, consisting of a single endless belt travelling over two drums.

Fig. 2 is a front view of the frame of Fig. 1.

Figure 3 shows a method of producing two distinct pictures which may be stereoscopic and colored, each of the component pictures being produced by one of the components of the alternating current. This is accomplished by the use of a single lamp possessing unilateral properties. This figure also discloses a prismatic reflector to throw all of the light of the lamp forward.

Fig. 4 shows a method of producing stereoscopic, colored pictures which utilizes the two components of the alternating current to build up two distinct pictures.

This application is a continuation in part application of application Serial No. 425,610, filed February 3, 1930, and upon which U. S. Patent No. 2,032,526 issued on March 3, 1936. The disclosure in this patent is to be read in conjunction with that of the above mentioned patent.

Various means for exploring the successive elemental areas of image fields, including two oppositely moving media bearing angularly arranged light permeable areas, and means for moving them are illustrated in my above mentioned Patent No. 2,032,526, which is the parent case from which this patent has been carved.

Figure 1 is a plan view of a very simple means of scanning which consists of an endless band $Ab$ which is moved by large wheels or drums 28 and 29. $Ab$ may be provided with sprocket holes, and in fact may be an actual motion picture film, and 28, 29, 30a, 30b, 30c, etc., may be provided with sprocket teeth.

Smaller wheels or rolls 30a, 30b, 30c, etc., cause the arm of the band to be brought close together in the frame $f$, which coacts with photoelectric element 5. A face view of this frame $f$, illustrated in Fig. 2 as having two image areas is shown and with two pairs of light permeable areas intersecting points, one pair in each area. The light permeable areas are shown at $a$ and $b$. If all of the $a$ and all of the $b$ areas were made of the same length angulation, the scanning would consist of the repeated scanning of a line in a fixed position, i. e., there would be no progression of the scanned line and consequently, no image. It is here to be particularly noted that there is really no difference between $a$ and $b$, that is, an $a$ going to the right would show as an $a$ in the figure, while an $a$ which has passed over the drum 29 and back to the upper arm of the band would act as a *b* area, as described in all of the previous figures. That is, the *b* shown in dotted lines in the figure is simply an *a* passing in the opposite direction. If one half of the band is provided with areas *a* equally spaced apart, and if the other half is provided with areas *a*, the distance between which is decremated by a certain decrement, there will be a precession or progression of the scanning lines, due to this decrement. In general, the decrement is equal to the width of the picture divided by the number of lines to the picture, i. e., a 48 line picture one inch wide would give 1/48 inch for the decrement. In a 48 line picture, 48 lines are provided, the space between the lines mentioned is decreased by 1/48 inch. The scanning will reverse its direction periodically. It is desirable to select the number of scanning lines as such that the reversal does not take place until an entire picture area is scanned. The wheels 28, 29, etc., are shown as thin disks with a toothed rim at their periphery, or they may be provided with wire spokes. They are intended for very high speeds. Obviously, the number of decreased spacing lines may be smaller than is necessary to scan a complete image aperture, in which case the scanning direction is reversed during the scanning of the image area. The band A*b* may be a section of a motion picture film with the areas photographed thereon, or made of any flexible material, even paper with the areas photographed, printed, cut, or produced in any other way desired.

Figure 4 shows a method of producing stereoscopic, colored television pictures. This serves as an illustration of the scanning arrangement at either the transmitter or receiver. This apparatus can be used in a form similar to Figure 1*a* of my above mentioned U. S. Patent 2,032,526 and Figure 4 may be considered as a plan view of Figure 1*a* of that patent in cross section, when the former is provided with the elements 25. *f* is the frame having two compartments associated with two image areas. Each compartment contains a photoelectric element 5. Each image area has placed in front of it the color screen 23*a*. One of these screens may be blue violet and the other orange red. Each image area has a cylindrical lens 1*c*. The function of the latter is to spread the picture laterally, in order that the picture may be viewed as a square. The lens and optical elements necessary for the projection are shown at 1. It will be noted that the two images are projected in a superposed manner. As described in connection with Figure 1*a* of the above patent, the two images are different and distinct. The use of the screens illustrated show that colored pictures may be produced. The screen Sc upon which the picture projected is provided with vertical ridges 23, those are supposed to cover all of the screen surface, and not a part as shown. The stereoscopic effect is produced by the fact that one lens projects its picture on one surface of each ridge principally, while the other lens projects its picture on the opposite surfaces of the ridges. The same relation of the lenses 1 is provided in taking the image and in receiving it at the receiving station. The two cylinders A and B are shown in their usual scanning relation. The stereoscopic effect is produced by the fact that two distinct pictures are taken and superposed, and also to the fact that the spectators in different parts of the theatre get different combinations of those pictures, or virtually different views, just as if real objects were being viewed. This type of screen has been illustrated in my previous applications, that of January 21, 1921, Serial No. 439,286 and that of February 21, 1922, Serial No. 538,339. The method of connecting up the photoelectric elements 5 differ from Figure 1*a* of the above patent, in that in the latter figure two carrier waves are necessary, while in Figure 6 but one is utilized. Each photoelectric element, whether at the receiver or the transmitter, is provided with a unilateral conducting element 25, whether crystal, electrolytic, vacuum tube, etc., etc., or other, and it will be noted that the component of the alternating current passing downward only, actuated the left element 5, while that component passing upward actuated the right element 5. It will be thus seen that such element is actuated by an interrupted directed current, which is really the sum of all of the components of the alternating current passing in one direction, the currents in each element being in opposite directions.

Figure 3 is an illustration of a special neon tube, or lamp which illuminates one element of the filament when the current passes in one direction and the other element of the filament when it passes in the other direction. The glow member is shown in the center as two segments of a circle 5. If direct current passes, only one of the segments is illuminated, the other being extinguished. A lamp of this kind is manufactured by the Cooper Hewitt Electric Company. An alternating current causes alternate glowing in each segment. This lamp is placed in a frame and housing *f* having a partition, and in such manner that the right hand visual area of the frame is illuminated when the current traverses that segment, and the left hand visual area of the frame *f* is illuminated when that segment is illuminated. Any reflecting means may be used, a prism 24 is shown which may be used if desired. Cylindrical surfaces A and B scan the image in the manner already frequently described. Color screen 23*a* and cylindrical lens 1*c* are shown. The disproportion between the right and left sides is due to the fact that a prism reflecting arrangement is illustrated in one portion. The rest of the figure is similar to Figure 6. The light 5 here acts as a unidirectional element, and this sorts the components of the alternating current to the corresponding luminous elements.

Having described my invention, I claim as new and desire to secure by Letters Patent:

1. A scanning apparatus consisting of a band bearing light permeable areas, means for supporting and moving said band, means for bringing the two arms of said endless band into apposition, all of said light permeable areas on said band being identical, except for a predetermined spacing variation, the intersections causing a light intersecting point to traverse an image area, the said spacing variation producing the desired precession of the scanning line.

2. A scanning band consisting of an endless band carrying identical light permeable areas, a portion of said areas bearing a space variation.

3. A television apparatus consisting of two oppositely moving media, suitable gearing operatively connected with said media, angularly arranged light permeable areas carried on said movable media which intersect to form scanning light points, a frame in which said light points move, two distinct apertures in said frame in each of which but one light point moves at a time to form a single image, a photoelectric element cooperating with each of said apertures and suitable circuits, each of said circuits containing oppositely disposed rectifying means to limit the current supplied to each of said elements to a definite direction operatively connected with said photoelectric elements whereby a specific component of an alternating current is supplied to each of said elements.

4. A television apparatus consisting of means for exploring the succesive elemental areas of two image fields, an image translating device cooperating with each of said fields and with said means for successively exploring said successive elemental areas, an electrical circuit in cooperative relation with each of said image translating devices, each of said circuits containing oppositely disposed rectifying means to limit the current supplied to each of said devices to a definite direction, whereby a specific component of an alternating current is supplied to each of said image translating elements.

5. A scanning element consisting of a flexible band bearing light permeable areas, one half of said light permeable areas being equally spaced apart and the other half of said light permeable areas being unequally spaced apart.

6. A scanning element consisting of a flexible band bearing light permeable areas, more than one half of said light permeable areas being equally spaced apart and less than one-half of said light permeable areas being unequally spaced apart.

ALOYSIUS J. CAWLEY.